United States Patent [19]
Gaiser et al.

[11] Patent Number: 6,021,090
[45] Date of Patent: Feb. 1, 2000

[54] HORIZONTAL AND VERTICAL RECEIVER-CONSISTENT DECONVOLUTION FOR AN OCEAN BOTTOM CABLE

[75] Inventors: James E. Gaiser, Littleton, Colo.; Frederick J. Barr, Houston; Josef Paffenholz, Missouri City, both of Tex.

[73] Assignee: Western Atlas International, Inc., Houston, Tex.

[21] Appl. No.: 09/089,913

[22] Filed: Jun. 3, 1998

Related U.S. Application Data

[63] Continuation-in-part of application No. 08/955,932, Oct. 22, 1997, abandoned.

[51] Int. Cl.$^7$ .................................................. G01V 1/36
[52] U.S. Cl. ........................... 367/15; 367/22; 367/101
[58] Field of Search ................................. 367/15, 21, 13, 367/24, 22, 38, 7; 181/122, 401, 402, 110

[56] References Cited

U.S. PATENT DOCUMENTS

| | | | |
|---|---|---|---|
| 5,163,026 | 11/1992 | Peynaud | 367/7 |
| 5,396,472 | 3/1995 | Paffenholz | 367/24 |
| 5,524,100 | 6/1996 | Paffenholz | 367/24 |
| 5,724,306 | 3/1998 | Barr | 367/15 |
| 5,724,307 | 3/1998 | Gaiser | 367/21 |

OTHER PUBLICATIONS

James E. Gaiser et al, "Vertical Seismic Profile Sonde Coupling", Geophysics, vol. 53, No. 2, pp. 206–214, Feb. 1988.

G.F. Moore et al, "Seismic Velocites at Site 891 from a Vertical Seismic Profile Experiment", Proceedings of the Ocean Drilling Program, Scientific Results, vol. 1 part 1., 12 pages, Jan. 1995.

J Paffenholz and F. Barr, An improved method for driving water–bottom reflectivities for processing dual–sensor ocean–bottom cable data, 65th Annual International Meeting, Society of Geophysics, Expanded Abstracts, SA3.2, pp. 987–990, Jan. 1995.

Jan D. Garmany, The Recovery of True Particle Motion from Three–Component Ocean Bottom Seismometer Data, Journal of Geophysical Research, vol. 89, No. B11, pp. 9245–9252, Oct. 1994.

An Improved Method for Deriving Water–Bottom Reflectivities for Processing Dual–Sensor Ocean–Bottom Cable Data; J. Paffenholz and F. Barr, 1995, 65th Ann. Internal. Mtg., Soc. Expl. Geophys., Expanded Abstracts, SA3.2, pp. 987–990.

The Recovery of True Particle Motion from Three–Component Ocean Bottom Seismometer Data; Jan D. Garmany, Journal of Geophysical Research, vol. 89, No. B11, pp. 9245–9252, Oct. 10, 1984.

21. Seismic Velocities at Site 891 from a Vertical Seismic Profile Experiment; G.F. Moore, J. Dellinger, M.E. Mackay, and H. Hoskins, Proceedings of the Ocean Drilling Program, Scientific Results, vol. 1, Part 1., 12 Pages.

Vertical Seismic Profile Sonde Coupling; James E. Gaiser, Terrance J. Fulp, Steve G. Petermann, and Gary M. Karner; Geophysics, vol. 53, No. 2 (Feb. 1988); pp. 206–214, 18 Figs.

Graiser et al (vertical seismic profile sonde coupling) Feb. 1988; pp. 206–214.

*Primary Examiner*—Christine Oda
*Assistant Examiner*—Anthony Jolly
*Attorney, Agent, or Firm*—Madan, Mossman & Sriram, P.C.

[57] ABSTRACT

The objective of this invention is to provide a method for estimating, in the frequency domain, deconvolution operators for removing spurious resonant coupling responses from the cross-line and the vertical seismic signal components in OBC surveys. The purpose is to balance the spectral response of the respective signal component in amplitude and phase in a manner consistent with the field geometry.

20 Claims, 6 Drawing Sheets

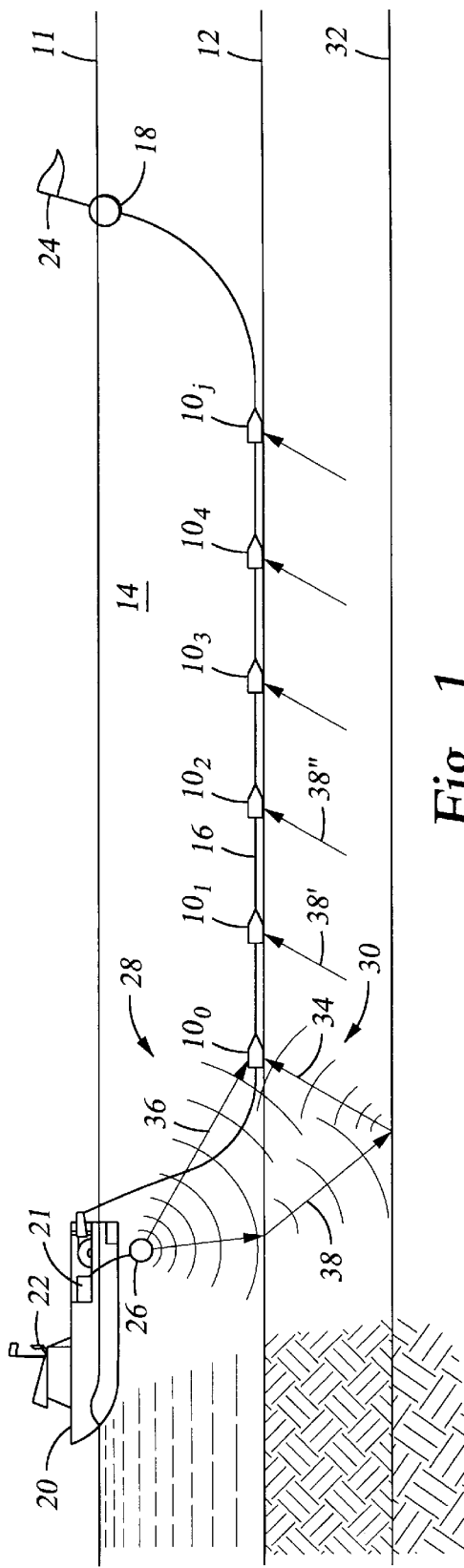
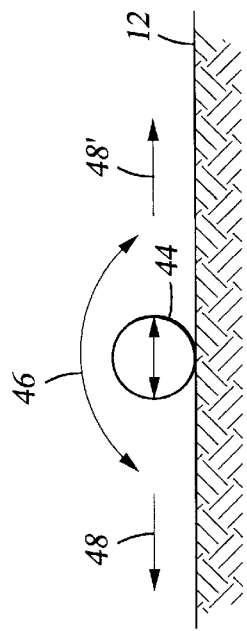
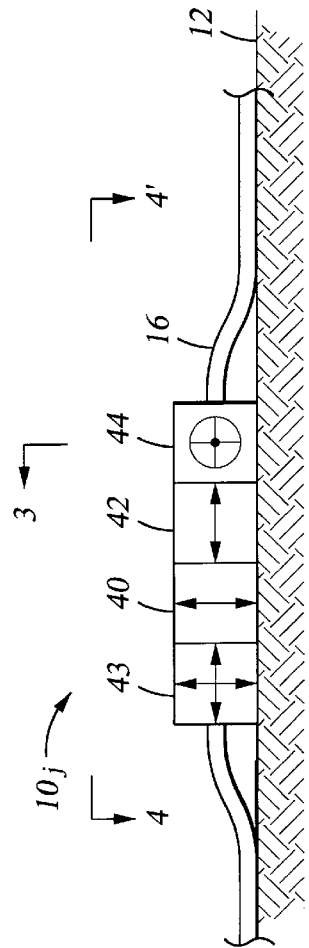
Fig. 1 (PRIOR ART)
Fig. 3
Fig. 2

HORIZONTAL AND VERTICAL RECEIVER-CONSISTENT DECONVOLUTION FOR AN OCEAN BOTTOM CABLE

RELATION TO OTHER APPLICATIONS

This application is a continuation-in-part of application Ser. No. 08/955,932, filed Oct. 22, 1997, now abandoned.

BACKGROUND OF THE INVENTION

1. Field of the Invention

This invention is concerned with improving the coupling response of multi-component seismic signals derived from sensors implanted on the water bottom. In general, the invention is concerned with the spectral balancing of the multi-component signals in a component-consistent manner with respect to the geometry of the sources and receivers.

2. Discussion of Relevant Art

Seismic exploration studies often involve use of both P-waves and S-waves. In marine operations, although compressional waves propagate through the water as pressure fields, shear waves do not because water has no shear strength. Therefore shear-wave studies, such as used in vertical rock-fracture studies, conducted in a water environment require use of 3-component motion-sensitive sensors, such as geophones in addition to pressure-sensitive hydrophones which normally are used in marine exploration. The geophones are planted directly on the water bottom using ocean bottom cables (OBC). For reasons to be explained later, a hydrophone is included with the OBC instrument package.

Please refer to FIG. 1 where a plurality of seismic sensor packages $10_0$, $10_1$, $10_2$, ..., $10_j$ (j=3,4,5, ..., n, where n is an integer) are shown laid on the bottom 12 of a body of water, 14. The sensor packages are spaced-apart by a desired separation such as 10 meters. The sensor packages are preferably multicomponent. A 4-component sensor generates electrical signals that are proportional to particle velocity of the water bottom material in each of three spatial axes and to differences in water pressure. The particle-velocity sensors are responsive to seismic waves in general and in particular to both compressional and shear waves. Hydrophones are sensitive only to pressure wavefields.

The sensors are mechanically and electrically coupled to a sectionalized ocean-bottom cable (OBC) 16 of any well-known type, which may be many kilometers long. The OBC includes communication channels, which may be electrical, optical or ethereal, for transmitting the individual sensor signals to suitable instrumentation of any well-known variety mounted in a service vehicle of any appropriate type. One or both ends of a cable may be marked by a buoy, such as 18, at the water surface 11, for later recovery. For three-dimensional (3-D) areal surveys, many cables may be laid out side-by side in parallel, perhaps 25 meters apart, in a wide swath.

Usually, the cables and sensor packages (hereinafter referred to as receivers) are laid out over the area to be surveyed by a cable-tender boat. At some later time, a service ship such as 20, recovers one or more cables, such as 16 from the water bottom. The signal communication channels are connected to multi-channel recording instrumentation of any desired type, generally shown as 21, installed in the ship 20, for receiving and partially processing seismic signals.

An acoustic sound source 26 is fired at each of a plurality of designated source locations distributed over an area of interest. The act of firing an acoustic source is defined as a shot. The source locations are preferably spaced apart by an integral multiple of the receiver spacings. Source 26 radiates wavefields such as generally shown by 28 and 30 to insonify subsurface earth layers such as 32, whence the wavefield is reflected back towards the surface as reflected wavefield 34. The receivers $10_j$ intercept the mechanical earth motions, convert those motions to electrical signals and send those signals through the communication channels, one channel per receiver or receiver group, to multi-channel recording equipment 21 of any desired type, in ship 20.

A wavefield may propagate through a volume of the earth along trajectories such as a refracted path (not shown), a direct travel path such as 36 or along reflected-ray travel paths such as 38, 38' and 38" to the respective receivers $10_j$. The different wavefield trajectories intersect at the source location. The recorded data are often presented in the form of time-scale traces, by way of example but not by way of limitation, one trace per communication channel.

A collection of time-scale traces resulting from a single source activation (shot 26) that insonifies a plurality of receivers $10_1$–$10_j$ such as in FIG. 1, constitutes a common shot gather. On the other hand, with reference to FIG. 5, a collection of time-scale traces as recorded by a single receiver $10_j$ after illumination by a plurality of spaced-apart shots $26_i$, $26_{i+1}$, $26_{i+2}$ constitutes a common receiver gather. Here, the different wavefield trajectories intersect at the common receiver. Other gathers such as common offset and common mid-point are known.

Since a shot and a receiver can always be interchanged by reason of the principle of reciprocity, given common processing and instrumentation, the two types of gather are equivalent. Since it is immaterial whether we are dealing with a common receiver gather or a common shot gather, throughout this disclosure, for simplicity, we will refer to gathers in general by the generic term: common trace gathers. By definition, a common-trace gather is a collection of time-scale recordings of signals representative of the traveltimes of a plurality of wavefields that have propagated through a volume of the earth over different trajectories which have a common intersection.

The horizontal separation between a source and a receiver, is defined as the offset, h. Typically in 3-D operations ship 20 occupies a convenient central location, interconnected with a plurality of cables and receivers, while a second shooting ship (not shown) actually visits the respective designated survey stations to generate common trace gathers. Typically, for OBC surveys, the data are digitally sampled at time intervals such as every four milliseconds, over a frequency passband of 5 Hertz to Nyquist. Other sample rates and passbands of course may be used.

FIG. 2 is a close-up, X-ray-like side view of a 4-component receiver $10_j$. The particle-velocity receivers (geophones) are polarized in-line (x axis), unit 42, cross-line (y axis), unit 44, vertically (z axis) unit 40. The double-headed arrows indicate the axis of maximum sensitivity. The pressure receiver (hydrophone), 43, responds to pressure differences as shown by the imploding arrows. Preferably, the two horizontally-polarized receivers respond to S-waves while the vertically-polarized receiver and the spatially unpolarized hydrophone respond to P-waves.

A 4-component receiver is customarily packaged in a single elongated case. The particle-velocity sensors are gimbal-mounted so as to become automatically aligned along their mutually orthogonal axes after deposition on the sea floor. For good and sufficient reasons, the case containing the receiver components is usually cylindrical. Cable 16 is relatively heavy. Secured to the fore and aft ends of the elongated receiver case, the cable 16 firmly holds a typical multi-axis receiver unit, $10_j$, to the sea floor 12. The in-line receiver component 42 is well coupled to sea floor 12 because of the inherent stability of the elongated case along the in-line direction. That happy situation in not true, however, for the cross-line receiver component 44.

Please refer to FIG. 3 which is an X-ray-like cross section of multi-component receiver $10_j$ taken along line 3–3', looking back towards ship 20. Because of its cylindrical shape, case $10_j$ can roll infinitesimally from side-to-side as shown by curved arrows 46, but water currents and other disturbances can cause the receiver case to roll and shift laterally in the cross-line direction as shown by arrows 48, 48'. Those disturbances do not affect the in-line receiver signal component because of its polarization direction but they can introduce severe noise to the cross-axis and to the vertically-polarized signal components.

Since the hydrophone is unpolarized, coupling noise is not a problem but as before stated, a hydrophone is transparent to S-waves.

FIG. 4 is the 4-component receiver $10_j$ as viewed from above along line 4–4' of FIG. 2.

A method for correcting poor coupling of a logging sonde in a borehole was described in a paper by J. E. Gaiser et al., entitled Vertical Seismic Profile Sonde Coupling, published in *Geophysics* n. 53, pp 206–214, 1988. Although that method is not directly applicable to 3-D seismic exploration, it is of interest because it demonstrates the evil effects of poor coupling of a sensor to the ground.

In a paper entitled "the Recovery of True Particle Motion from Three-component Ocean Bottom Seismometer Data by J. D. Garmany, published in the *Journal of Geophysical Research*, v. 89,n. B11, p.9245–9252, 1984, a theory and method is presented to correct for poorly coupled ocean bottom seismometers (OBS) that considers the OBS as a Hamiltonian system having many degrees of freedom with only three inputs and three outputs. A matrix Levinson recursion method is used to solve for z-transform operators applied to the recorded signals to recover true particle motion. Although this method makes no assumptions about a complicated system of springs and dashpots, it also does not incorporate a specific geometry of the source or receiver system on the water bottom.

G. F. Moore et al, in Seismic Velocities at Site 891 from a Vertical Seismic Profile Experiment, published in *Proceedings of the Ocean Drilling Program, Scientific Results*, v.146, pt.1, p 337–348, offered another method wherein they compute vector deconvolution operators in the time domain for borehole seismic data. They use assumed linear polarization directions of the windowed direct arrival (source-receiver directions) to solve for operators in the least squares sense. However it does not consider the specific receiver geometry for limiting solutions to particular directions of motion.

In an article entitled *An Improved Method for Deriving Water-bottom Reflectivities for Processing Dual Sensor Ocean Bottom Cable Data,* Expanded Abstracts paper SA3.2, pages 987–990, 1995, 65th Annual Meeting of the Society of Exploration Geophysicists, J. Paffenholz et al, explain that dual-sensor processing in which velocity and pressure signals are recorded in OBC surveys requires the use of scale factors that are functions of the ocean bottom reflectivity. They describe a new method to derive the ocean bottom reflectivity from production seismic data. The method eliminates the need for a separate calibration survey and is stable in the presence of random and shot-generated noise. This method may be adapted for use in processing 4-component seismic receiver data.

U.S. Pat. No. 5,524,100 issued Jun. 4, 1996 to J. Paffenholz and which is incorporated herein by reference teaches that pressure and velocity signals may be combined. The combined signal is transformed into the frequency domain and multiplied by the inverse Backus operator or the combined signal is convolved with the inverse Backus operator and an optimization algorithm is utilized to solve for water bottom reflectivity. Pressure and velocity seismic signals are combined and the combined signal is multiplied by the inverse Backus operator containing the water bottom reflection to eliminate first order peg-leg multiples.

There is a long-felt need for a method for measuring and suppressing signal distortion attributable to poor water-bottom coupling of a component of an ocean-bottom, cable-mounted, multi-component seismic receiver and for balancing the spectral response of the respective components.

SUMMARY OF THE INVENTION

This is a computer-aided method for balancing the spectral response characteristics of seismic signal components polarized along the in-line, cross-line and vertical axes. The method contemplates receiving by at least one multi-component receiver, a plurality of seismic signals representative of wavefield travel times. Preferably, the signals are formatted and stored in a computer memory as an array of common-trace gathers of in-line, cross-line, vertical and pressure signal components. The respective gathers are transformed from the time domain to the frequency domain. For each frequency of interest, cross-line and vertical coupling coefficients are generated by minimizing, in a least-squares sense, the sum of a selected subset of the in-line, cross-line and vertical signal components. Using the so-generated cross-line and vertical coupling coefficients, the corrected cross-line responses are calculated over all travel times and shots. For each frequency of interest, a second cross-line coupling coefficient is generated by minimizing, in a least-squares sense, the sum of a subset of the vertical signal components and the corrected cross-line responses. A set of partially-corrected vertical responses are calculated from said second cross-line coupling coefficient. For each frequency of interest, a second vertical coupling coefficient is calculated by minimizing in a least-squares sense, a subset of the partially-corrected vertical response components and the pressure signal components. Using the second vertical coupling coefficients, the fully-corrected vertical coupling response is calculated for all times and all traces. The in-line, corrected cross-line and corrected vertical signal components are transformed from the frequency domain to the time domain. The so-transformed signal components are then stored for displaying as a model of the subsurface or for further processing in any desired manner.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 1 is a conventional view of a ship servicing an ocean-bottom cable to which are coupled a plurality of multi-axis sensors, also demonstrating the concept of common shot gathers;

FIG. 2 is an X-ray-like cross section of a four-component seismic receiver;

FIG. 3 is an end view of the four-component seismic receiver;

DETAILED DESCRIPTION OF THE PREFERRED EMBODIMENT

Figure 4:
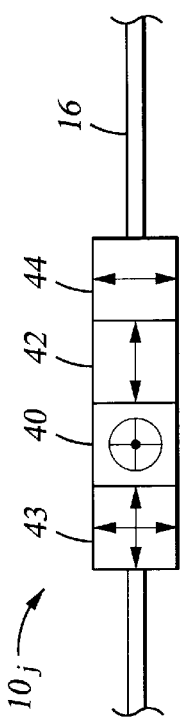
FIG. 4 is a view of the four component receiver of FIG. 2 as seen from above.
Figure 5:
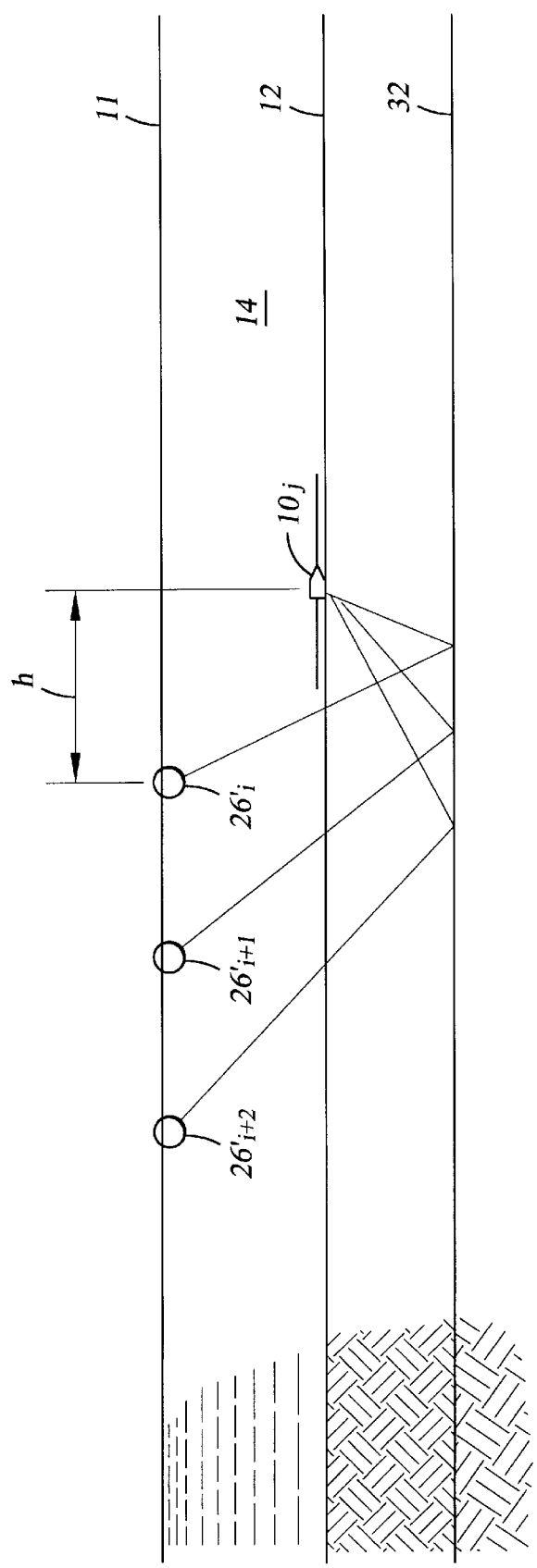
FIG. 5 illustrates the concept of common receiver gathers.
Figure 6:
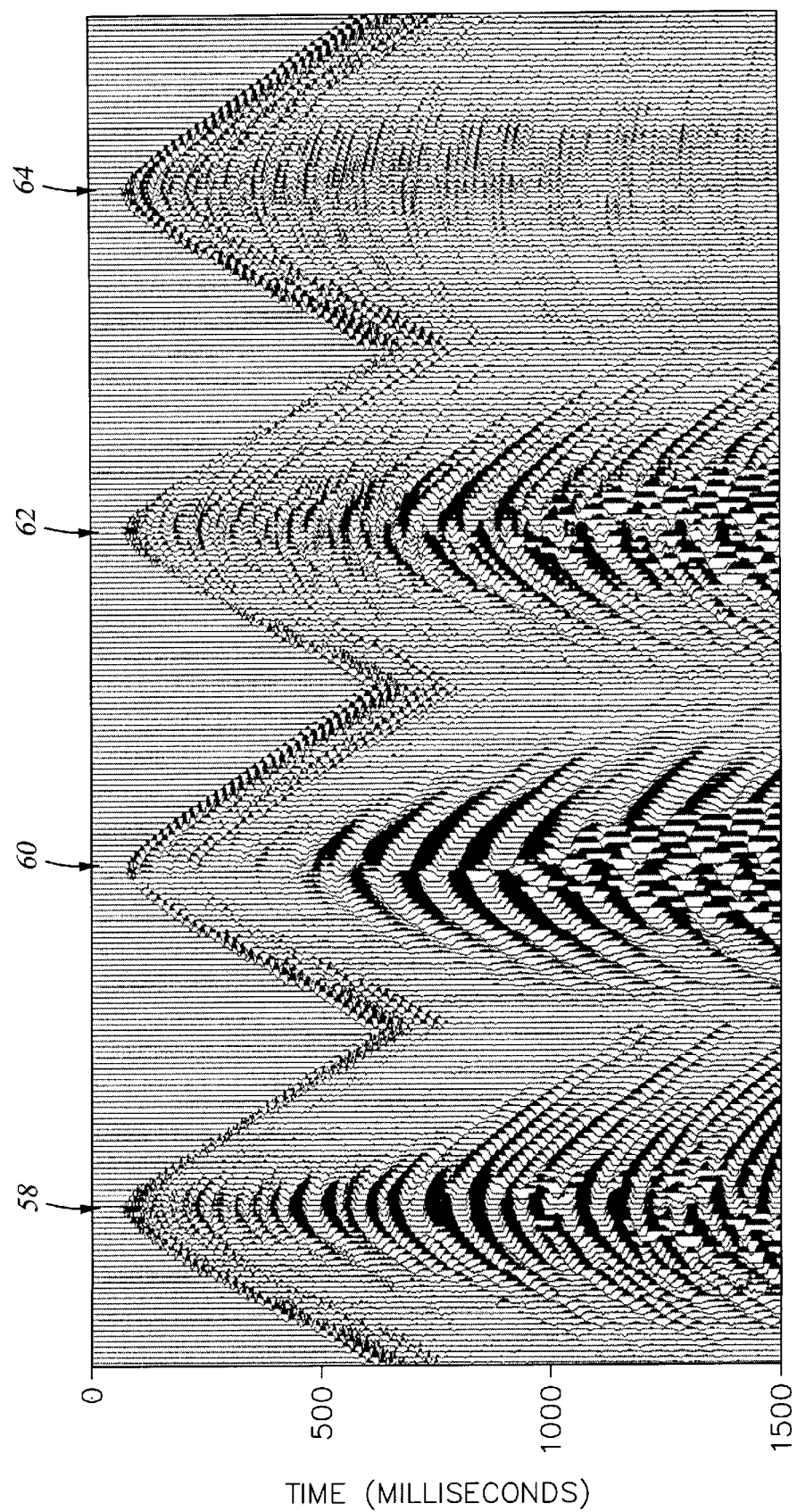
FIG. 6 is a panel showing a comparison of an in-line gather of seismic signals, a cross-line gather of seismic signals, a gather of vertically-polarized signals and a gather of hydrophone signals.

FIG. 6 is a panel of time-scale traces representative of four co-located common trace gathers, 58, 60, 62, 64 which display respectively from left to right, in-line, cross-line and vertical particle-velocity geophone signals and pressure hydrophone signals. As a matter of interest, the sensitive axis of the in-line receiver is aligned about 20° away from the azimuth of the shot line. Direct water arrivals, reflected events and refracted events appear on the in-line and cross-line gathers, 58 and 60, in addition to low frequency interface waves. The cross-line gather, 60, exhibits high-amplitude, low-frequency resonant response of converted-wave reflections and interface waves. The vertical gather, 62, also exhibits high-amplitude, low-frequency converted-wave reflections and interface waves interfering with compressional-wave reflections. Pressure-signal gather 64 consists of only direct water arrivals and compressional-wave reflections and refractions.

Figure 7:
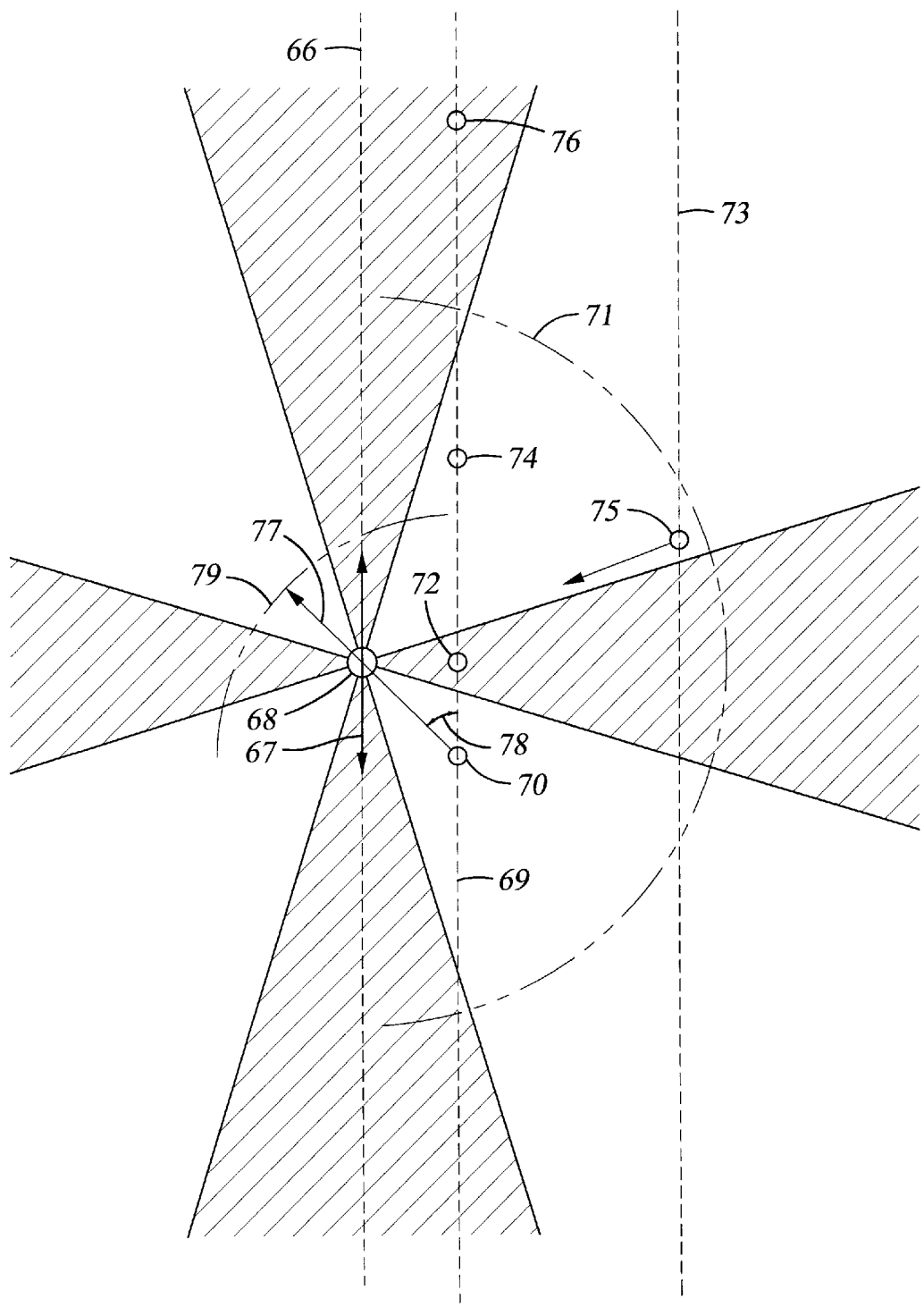
FIG. 7 illustrates the criteria for data selection to be used in processing with reference to the shot-receiver geometry in the field.

Please refer now to FIG. 7. An OBC represented by solid line 66, is laid along a receiver line having an in-line azimuth which happens to be north or 0° for this example. A plurality of 4-component receivers are mounted in cable 66, one of which, 68, is a receiver such as might have been responsible for the common trace gathers of FIG. 6. Receiver 68 contains three mutually orthogonally polarized seismic geophone receivers as previously described, one of which is polarized in-line according to the double-headed arrow 67. An unpolarized pressure receiver (hydrophone) is also included in the package.

An acoustic source advances along a shot line (dashed line 69) parallel to but offset from line 66 by a few tens or hundreds of meters. The source sequentially visits a plurality of designated stations that are uniformly spaced-apart along line 69 whereat a shot is fired. Some exemplary stations are shown by small circles 70, 72, 74, 76. For simplicity, only one receiver, 68, from one receiver-line 66 is shown. Four source stations chosen at random from along a shot line 69 are shown. A second shot line 73 and source location 75 are also shown. In an actual 3-D seismic survey, many receiver lines and many shot lines would be occupied.

The objective of this invention is to provide a method for estimating, in the frequency domain, deconvolution operators for removing the coupling responses from the cross-line and the vertical seismic signal components in OBC surveys. The purpose is to balance the spectral response of the respective wavefield components in amplitude and phase in a manner consistent with the field geometry. For a selected common trace gather, trace-consistent cross-line and vertical vector deconvolution operators are determined from a few selectively-chosen local data subsets for application to a universe of global data included in that common trace gather over all trajectories and all times. The process is repeated for all sources and receivers taken in all combinations.

The method proposed to determine the deconvolution operators for the cross-line and the vertical components is by least squares minimization methods applied in the frequency domain. For each frequency, complex coefficients are determined such that a particular equation is minimized. The entire bandwidth of these operators contains the appropriate coupling responses. The approach to be described minimizes the first arrival energy of the transverse component over a shallow reflection-time window, containing the early arrivals, that is 500 to 1000 milliseconds long measured from the first breaks. Early arrivals are preferred because they are less contaminated by noise and undesirable wavefields such as out-of-the-plane energy and split shear waves. The energy in the window is assumed to be predominantly polarized in the vertical plane, even in the presence of azimuthal anisotropy, and thus also in the radial and vertical components. The transverse component is assumed to be relatively devoid of energy in the window of interest. Near-offset data originating from offsets less than about 500–750 meters are normalized for spherical spreading due to varying offsets. Far-offset data, such as that from source location 76, FIG. 7, which lives beyond some preferred limiting offset range defined by arc 71, preferably are not used.

It is assumed that the received seismic signals are discretely sampled at some preferred sample interval such as 4 milliseconds (ms) and that the frequency bandwidth extends from about 5 Hertz to Nyquist by way of example but not by way of limitation.

In the discussion to follow, it is presumed that the in-line receiver or geophone is well coupled to the water bottom and that, for horizontal motions, the cross-line coupling response can be corrected using the in-line response as a reference. It is further assumed that, for compressional wavefields, the pressure receiver or hydrophone is well coupled to the water and thus serves as a reference for correcting the coupling response of the vertically-responsive geophone.

A accurate model to describe the recorded signals, x', for an ocean-bottom cable (OBC) survey is given in matrix form by $$x' = Gx \quad (1)$$

where the x are actual ground motions and G is a 3×3 matrix of frequency-dependent complex coefficients. These coefficients are related to the receiver coupling and describe the interaction of compliant motions of the three-component geophone system. Ideally this system is rigid and moves congruently with the medium it is in contact with for all directions of motion. However, if there are directions of the system where mechanical compliance exists, damped oscillations can occur in those directions and contaminate the recordings of the three components.

The interaction of coupling terms in the frequency domain is introduced by the generating function where I is a 3×3 identity matrix and $W_i$ are complex coupling responses from a system of springs and dashpots that are $$G = \prod_{i=1}^{n} [I - (1 - W_i(\omega))D_i] \quad (2)$$

ideally unity. Geophone instrumental responses could also be included but will be ignored here and assumed to be unity for all frequencies. $D_i$ are 3×3 matrices associated with $W_i$ that describe the independent direction of motion within the coordinate system. The components of $D_i$ are the resultant output motions for unit inputs. Note that in the formulation, interaction of the independent terms can be interpreted as convolutions in the time domain if the terms, $D_i$, are not orthogonal.

For the ocean bottom cable system there are assumed to be four independent degrees of freedom of motion related to the symmetry of an OBC. The first three are the principal directions of the coordinate system: the in-line direction parallel to the cable where $$W_1 = I, \quad D_1 = \begin{pmatrix} 1 & 0 & 0 \\ 0 & 0 & 0 \\ 0 & 0 & 0 \end{pmatrix}, \quad (3)$$

the cross-line direction perpendicular to the cable where, $$W_2 = C, \quad D_2 = \begin{pmatrix} 0 & 0 & 0 \\ 0 & 1 & 0 \\ 0 & 0 & 0 \end{pmatrix}, \quad (4)$$

and the vertical direction normal to the water bottom where, $$W_3 = V, \quad D_3 = \begin{pmatrix} 0 & 0 & 0 \\ 0 & 0 & 0 \\ 0 & 0 & 1 \end{pmatrix}, \quad (5)$$

The fourth component of motion is an infinitesimal rotation about the axis of the cable where $$W_4 = R, \quad D_4 = \begin{pmatrix} 0 & 0 & 0 \\ 0 & \sin^2(\phi) & -\sin(\phi)\cos(\phi) \\ 0 & -\sin(\phi)\cos(\phi) & \cos^2(\phi) \end{pmatrix}, \quad (6)$$

and $\phi$ is the direction the geophone package is situated on the cable in the cross-line/vertical plane ($\phi=0°$ in the cross-line direction and $\phi=90°$ the vertical direction). For this model, $R \approx \delta\phi \cdot d$, where $\delta\phi$ are the infinitesimal motions or changes in $\phi$, and d is the distance from the axis of rotation to the geophone.

For a rigid system, I, C, V and R are all one and G will be an identity matrix. If these coupling terms are not one, i.e., there are resonances in the bandwidth of the signal due to compliance in one or more of these directions, then $$G = \begin{pmatrix} I & 0 & 0 \\ 0 & C(1-\sin^2(\phi)(1-R)) & C\sin(\phi)\cos(\phi)(1-R) \\ 0 & V\sin(\phi)\cos(\phi) & V(1-\cos^2(\phi)(1-R)) \end{pmatrix} \quad (7)$$

upon expanding (2).

Substituting (7) into (1) and simplifying the notation yields $$\begin{pmatrix} x' \\ y' \\ z' \end{pmatrix} = \begin{pmatrix} I & 0 & 0 \\ 0 & C_y & C_z \\ 0 & V_y & V_z \end{pmatrix} \begin{pmatrix} x \\ y \\ z \end{pmatrix} \quad (8)$$

where the x motions are oriented in the in-line direction parallel to the cable, y motions are oriented in the cross-line direction perpendicular to the cable and z motions are in the vertical direction. It is assumed that the coupling is perfect in the in-line direction, thus I is unity for the x component. It is also assumed that the cross line and vertical components are imperfectly coupled, given by $C_y$ and $V_z$ respectively, and that motions about the axis of the cable on the water bottom result in the off-diagonal terms $V_y$ and $C_z$ for the cross-line and the vertical signal components. The values for the coupling coefficients in equation (8) are equal to the relationships in equation (7).

Inverting (8) to recover actual ground motions x, y, and z gives $$\begin{pmatrix} x \\ y \\ z \end{pmatrix} = \frac{1}{det|G|} \begin{pmatrix} det|G| & 0 & 0 \\ 0 & V_z & -C_z \\ 0 & -V_y & C_y \end{pmatrix} \begin{pmatrix} x' \\ y' \\ z' \end{pmatrix}, \quad (9)$$

where the determinant is $det|G|=V_zC_y-V_yC_z=CVR$, and the primed quantities are the data as actually recorded. Clearly, the in-line response is x=x' and is uncoupled from the cross-line and vertical response in this formulation. For perfect coupling, $C_y$ and $V_z$ are unity and $V_y$ and $C_z$ are zero. If $C_y$ and $V_z$ are not unity and $V_y$ and $C_z$ are not zero and these values are known, we can remove the effects of coupling and obtain the original ground motion.

The approach described here uses the in-line and hydrophone response as a reference of the wavefield for horizontal and vertical particle motion to design vector deconvolution operators in a least squares energy sense to be adapted to the cross-line and vertical data. Values for these terms are determined for each frequency independently without the assumption of a complicated spring-dashpot system of resonant motions.

The first step to determine the vector deconvolution operator is to determine the actual cross-line response. The procedure used here exploits the physics for a P-wave source that provides polarized P-waves and PS-waves for early near-offset arrivals that have particle motion predominantly in the source-receiver vertical plane, i. e., the plane containing the vertical and the radial vector with respect to the source station of origin. The data subset to be selected for processing includes data that are preferably located within a sector embracing a source-receiver azimuth of 45°±α° relative to the orientation of the in-line receiver component. Here α is an arbitrary tolerance such as 30°. Referring back to FIG. 7, data from shot stations such as 72 and 76 in the shaded zones, outside the so-delimited sectors and beyond a range of about 500–700 meters are considered to be far-field and not used. Other limits could, of course, be imposed without departing from the teachings of this invention.

For purposes of this disclosure, a receiver or receivers of interest is insonified from one or a plurality of near-offset acoustic source locations by wavefields emanating from acoustic sources residing within a near-offset region which is defined by a pre-selected range and azimuth relative to the receiver of interest.

The vertical plane contains vertical motion and radial horizontal motion for the direct P-wave, the reflected P and PS waves, and the elliptically polarized water sediment interface waves. Radial horizontal motion $x_r$ is obtained by vector rotation of the in-line and cross-line components given by $$x_r = \cos(\theta)x + \sin(\theta)y, \quad (10)$$

where the angle $\theta$ is the amount of rotation necessary to point the in-line receiver vector, 77, away from the source perpendicular to the wavefront 79 emanating from source location 70 in a radial direction such as angle 78 of FIG. 7. The component of the particle motion of these waves perpendicular to the vertical plane (transverse horizontal) is minimal. Transverse horizontal motion, $y_t$, normal to the vertical plane is given by the rotation, $$y_t = -\sin(\theta)x + \cos(\theta)y. \quad (11)$$

Equation (11) leads to the hypothesis that the summed energy of the transverse horizonal components after transformation to the frequency domain, as given by $$\Sigma_i |-\sin(\theta_i)x_i(\omega) + \cos(\theta_i)y_i(\omega)|^2 = \min, \quad (12)$$

is a minimum for each angular frequency $\omega$. Summation $\Sigma_i$, is over many shots from different directions into a single receiver station and the angle $\theta_i$ is the rotation for the ith source. Substituting for $x_i$ and $y_i$ from equation (9) gives $$\Sigma_i |-\sin(\theta_i)x'_i + \cos(\theta_i)[c_y(\omega)y'_i + v_y(\omega)z'_i]|^2 = \min, \quad (13)$$

where the complex coefficients to be solved in the least squares sense are $c_y = V_z/\det|G|$ and $v_y = -C_z/\det|G|$. In equation (13), the data used for the analysis are selected from a subset of the 4-component receiver gathers such as in FIG. 1 which lie at near offsets within a limited time window. Imperfect coupling of y' and z' produces amplitude and phase distortions of the seismic waves that are not compatible with the x' and result in spurious transverse energy.

Expanding equation (13) and differentiating with respect to the complex conjugates of $c_y$ and $v_y$ leads to the normal equation $$\begin{pmatrix} \sum_i \cos^2(\theta_i) y'_i \bar{y}_i & \sum_i \cos^2(\theta_i) z'_i \bar{y}_i \\ \sum_i \cos^2(\theta_i) y'_i \bar{z}_i & \sum_i \cos^2(\theta_i) z'_i \bar{z}_i \end{pmatrix} \begin{pmatrix} c_y(\omega) \\ v_y(\omega) \end{pmatrix} = \begin{pmatrix} \sum_i \sin(\theta_i)\cos(\theta_i) x'_i \bar{y}_i \\ \sum_i \sin(\theta_i)\cos(\theta_i) x'_i \bar{z}_i \end{pmatrix} \quad (14)$$

where the bar denotes the complex conjugate of the primed quantities $x'_i$, $y'_i$, and $z'_i$. After computing the summations from many source contributions and inverting the 2×2 matrix, $c_y$ and $v_y$ can be solved for each frequency. The corrected cross-line response for all shot-receiver combinations and all times is just $$y(\omega) = c_y(\omega)y'(\omega) + v_y(\omega)z'(\omega), \quad (15)$$

the term in the square brackets in equation (13). These operators are applied in a trace-consistent manner as vector operators: a multiplication in the frequency domain is a convolution in the time domain.

Next, the vertical component must be corrected by a vector deconvolutional operator in a trace-consistent manner which is accomplished in two separate steps. The first step is to minimize the response $z(\omega)$ for each frequency because it has the added S-wave contribution from the cross-line component. This leads to the least-squares problem, $$\Sigma_i |V_z(\omega)z_i|^2 = \Sigma_i |z_i' - c_z(\omega)y_i|^2 = \min \quad (15.1)$$

from equation 8 where $c_z = V_y$ and the corrected cross-line response, $y(\omega)$, is used. As with equation (14), the summation is over all shots in a selected data subset. Expanding (15.1) and differentiating with respect to the complex conjugate of $c_z$ leads to the normal equation, $$c_z(\omega) \sum_i y_i \bar{y}_i = \sum_i z'_i \bar{y}_i \quad (15.2)$$

where $c_z(\omega)$ easily can be solved.

Having determined $c_z(\omega)$ in a least squares sense for all shots contributing to the analysis, the corrected vertical response is given by, $$v_z(\omega)z(\omega) = z'(\omega) - c_z(\omega)y(\omega) = z''(\omega) \quad (15.3)$$

where $z''(\omega)$ is the actual vertical ground motion multiplied by the coupling response $V_z$.

The second step is to use the actual pressure wavefield, $p(\omega)$, as derived from the fourth component of the sensor package, the hydrophone, as a reference signal for the p-wave reflections. The equations for the P-wave reflectivity, $\beta(\omega)$, including the water-trapped energy and peg-leg reverberations as taught by Paffenholz et al. and the Paffenholz '100 patent earlier cited are:

$$p(\omega) = \frac{(1 + r_b)}{(1 - r_b r_s e^{i\omega\tau})} + (1 - r_b^2) \frac{(1 + r_s e^{i\omega\tau})}{(1 - r_b r_s e^{i\omega\tau})^2} \beta(\omega) \quad (16)$$

for the hydrophone and $$z(\omega) = \frac{-(1 - r_b)}{(1 - r_b r_s e^{i\omega\tau})} + (1 - r_b^2) \frac{(1 - r_s e^{i\omega\tau})}{(1 - r_b r_s e^{i\omega\tau})^2} \beta(\omega) \quad (17)$$

for the geophone data where $r_b$ is the water bottom reflectivity, $r_s$ is the water surface reflectivity and $\tau$ is the two-way travel time in the water layer. The exponential operator, $e^{i\omega\tau}$, represents a time delay of $\tau$ seconds in the time domain.

A suitable constraint for the least squares minimization is to eliminate the common factor in equations 16 and 17 giving $$\sum_i \left\| \left[ p_i(\omega) - \frac{2}{(1 - r_s e^{i\omega\tau})} \right] - \left[ \frac{(1 + r_s e^{i\omega\tau})}{(1 - r_s e^{i\omega\tau})} z_i(\omega) \right] \right\|^2 = \min, \quad (18)$$

where the summation i is over all shots contributing to the analysis. Assuming perfect coupling of the hydrophones with the water, $p(\omega) = p'(\omega)$, the recorded hydrophone data and substituting for $z(\omega)$ from equation (15.3) gives $$\sum_i \left\| \left[ p'_i(\omega) - \frac{2}{(1 - r_s e^{i\omega\tau})} \right] - \left[ \frac{(1 + r_s e^{i\omega\tau})}{(1 - r_s e^{i\omega\tau})} v_z(\omega) z''_i \right] \right\|^2 = \min, \quad (19)$$

where $v_z = 1/V_z$. Following a similar least-squares procedure for the cross-line component above to obtain the normal equation, $v_z$ can be solved for each frequency.

Appropriate data for equation (19) are derived from a selected data subset derived from the near offsets, $h_i$, within about twice the water depth ($\tau V_w$) for all source-receiver azimuths where the time windows are long enough to include the direct arrival and a majority of the reflection sequence. However, in shallow environments where $h_i > \tau V_w$, there may not be a significant number of shots that fit this requirement. In such cases, the direct arrival and the water-trapped energy that never penetrates the water bottom should be excluded from the analysis. Thus the equations for the hydrophone and geophone data become $$p(\omega) = (1 - r_b^2)\frac{(1 - r_s e^{i\omega\tau})}{(1 - r_b r_s e^{i\omega\tau})^2}\beta(\omega) \qquad (20)$$

and $$z(\omega) = (1 - r_b^2)\frac{(1 - r_s e^{i\omega\tau})}{(1 - r_b r_s e^{i\omega\tau})^2}\beta(\omega) \qquad (21)$$

respectively and the equation for minimization is just $$\sum_i \left| p_i' - \left[\frac{(1 + r_s e^{i\omega\tau})}{(1 - r_s e^{i\omega\tau})} v_z(\omega) z_i''\right] \right|^2 = \min, \qquad (22)$$

for each frequency. Here the data windows exclude the direct water arrival and begin within the reflection sequence such that the near vertical incident P-wave reflections are analyzed.

Equations (19) or (22) can now be solved following a similar least squares procedure for the cross line component. As an example, expanding equation (22) and differentiating with respect to the complex conjugate $v_z$ gives $$v_z(\omega)\sum_i \overline{z_i''} z_i'' = \frac{1}{r_s'}\sum_i p_i' \overline{z_i''} \qquad (23)$$

where the ratio in (22) is defined as $r_s'$ and the bar denotes the complex conjugate of the primed quantity $z_i''$. After computing the summations from many source contributions $v_z$ can be solved easily for each frequency. The corrected vertical-response $$z(\omega) = v_z(\omega) z''(\omega) \qquad (24)$$

is computed by the application of the operator in a trace-consistent manner. A very attractive feature of this method is the actual coupling responses C, V, and R and the orientation φ of the geophone package on the cable need not be known in equations (15), (15.3) and (24). These can be calculated if desired from the known values of $c_y$, $v_y$, $c_z$ and $v_z$ for each frequency.

Calculation of the crossline and vertical response vector deconvolution operators completes the initial data analysis. Next, all of the signals in the common-trace gather are transformed from the time domain into the frequency domain. The cross-line signals are corrected by application of the crossline vector deconvolution operator and the vertical response signals are corrected by application of the vertical vector deconvolution operator thereto. The process is repeated for all combinations of sources and receivers included in the gathers.

Figure 8:
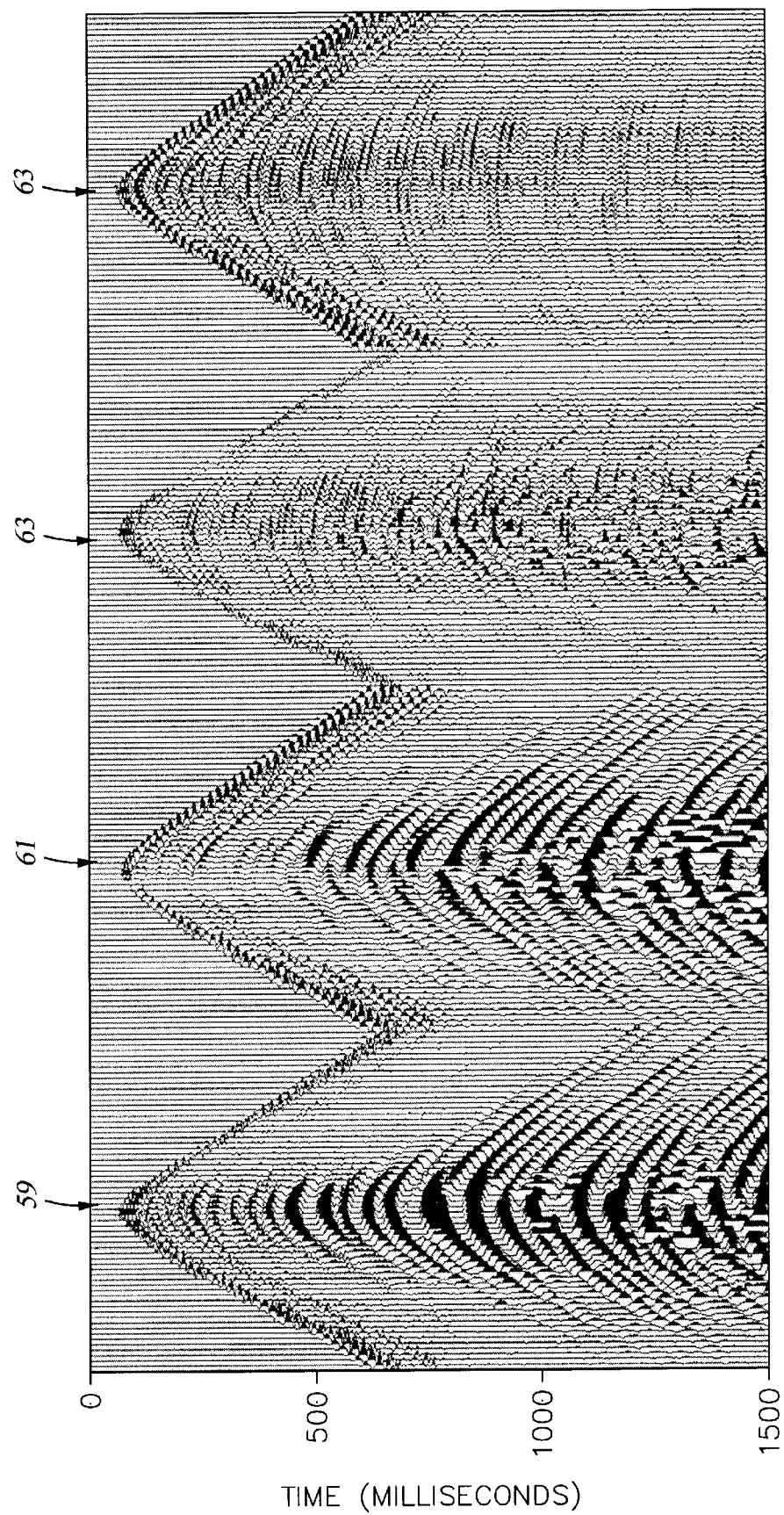
FIG. 8 is a panel showing the same data as FIG. 6, after processing by the method of this invention.

The corrected signals may be displayed such as in FIG. 8 which shows the common trace gathers 59, 61, 63, 65 corresponding to the four common-trace gathers 58, 60, 62, 64 previously shown in FIG. 6, after application of the least-square operators in equations (15), (15.3) and (24). The pressure-signal display, 65, remains unchanged as does the in-line component 59 because those are the signal components that were assumed to have a coupling response of unity. The cross-line component in panel 61 matches the in-line response and the high-amplitude low-frequency interface wave has been substantially reduced. On the vertical component, panel 63, most of the of the converted-wave energy has been removed. Compressional-wave reflections stand out clearly in both the shallow and the mid-depth portion of the panel.

Figure 9:
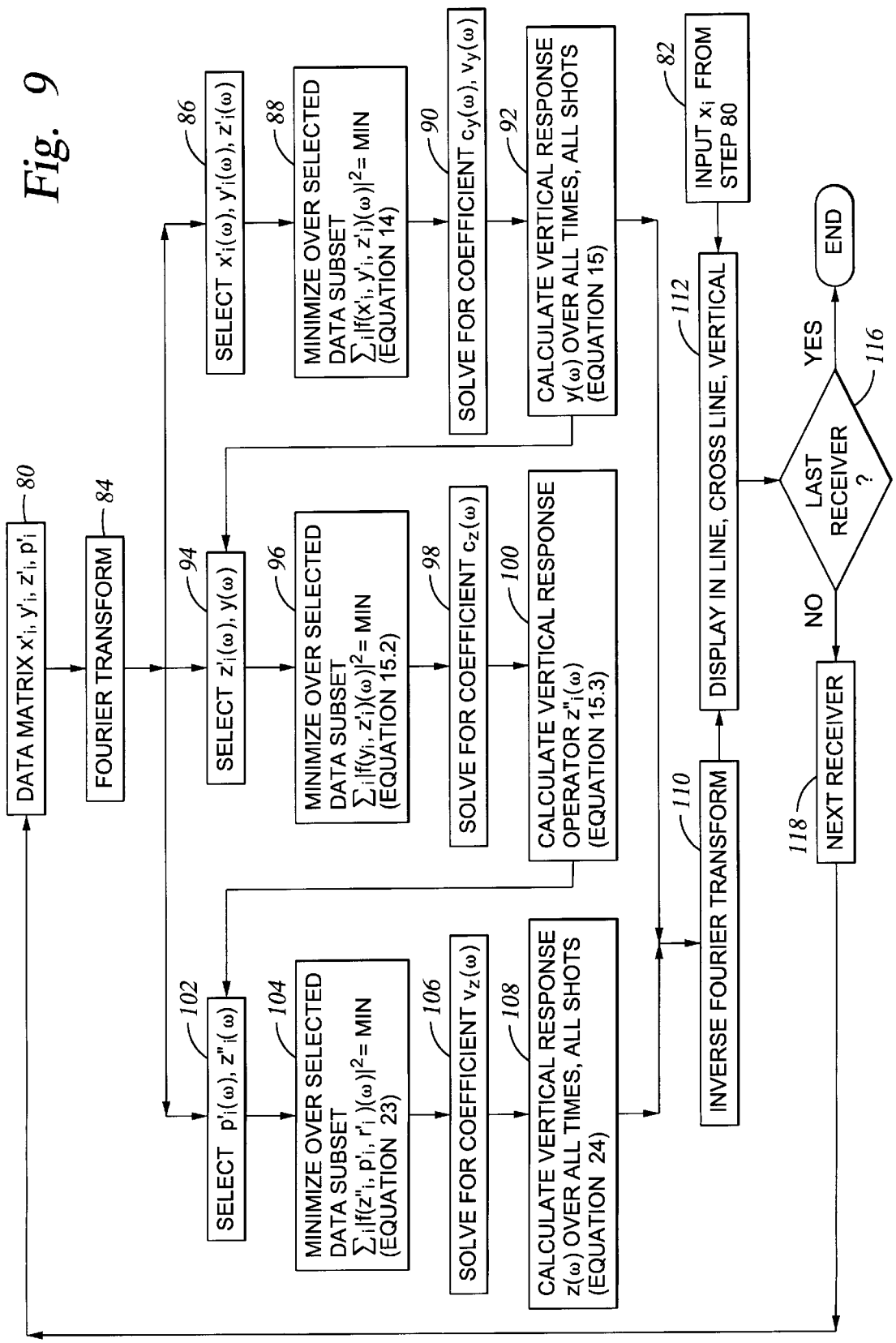
FIGS. 9 is a flow diagram showing the sequence of data-processing steps taught by this invention.

The best mode of operation is most conveniently explained by the flow diagram shown in FIG. 9 which is to be taken as exemplary but not limiting. As with any computer-aided process, diverse strategies can be used to accomplish the same end result.

One or many desired multi-component receivers $10_{jk}$ are insonified from one or a plurality of arbitrarily-selected source locations $26_i$ (not shown in FIG. 9). The resulting set of data signals from co-located receivers (geophones) 40, 42, 44 and receiver 43, (a hydrophone), may be formatted as common-trace wavefield gathers of in-line, $x_i'$, cross-line, $y_i'$, vertical, $z_i'$, and pressure, $p_i'$, data. The data are entered as a multi-dimensional ordered array in a matrix, such as a computer memory 80. For a selected common trace gather, data are strobed out from matrix 80 and introduced to Fourier-transform subroutine 84 for transformation from the time domain to the frequency domain. At 86, a set of data signals $x_i'(\omega)$, $y_i'(\omega)$, $z_i'(\omega)$ are selected. The selected signals are resolved as radial vectors using equations (10) and (11) and normalized for spherical divergence as required. At 88 a data subset is selected over which a least-squares summation is performed in accordance with equation (14). The data subset includes data from near offsets, $h_i$, embraced by a pre-defined reflection-time window such as 1.0 second from the first arrivals as previously explained. The cross-line coupling coefficients $c_y(\omega)$ and $v_y(\omega)$ are solved at step 90. Using the cross-line coupling coefficients from step 90, the resolved corrected cross-line response, $y(\omega)$, is calculated at step 92 for all shots using equation (15).

It now remains to correct the vertical response. Triggered by reception of the corrected cross-line response $y(\omega)$ output from step 92, data selector 94 extracts the raw values for $z_i'(\omega)$ from matrix 80 via subroutine 84. With the aid of the operation indicated by equation (15.2), the least-squares summation is performed over the previously-defined data subset at step 96. The first of two coupling coefficients, $c_z(\omega)$, is solved at step 98. With the aid of that quantity, the vertical response $z_i''(\omega)$ is calculated at step 100 using equation (15.3).

Vertical response $z_i''(\omega)$ is input to data selector 102 and causes the selector 102 to extract the $p_i'(\omega)$ from matrix 80 via subroutine 84. Using $p_i'(\omega)$, $z_i''(\omega)$, and the previously-defined data subset, the summation indicated by equation 23 is performed at step 104. The second of two coupling coefficients, $v_z(\omega)$, may now be solved at step 106. The corrected vertical response $z(\omega)$ may be calculated at step 108 over all shot and receiver combinations using equation (24).

The corrected cross-line response $y(\omega)$ and the corrected vertical response $z(\omega)$ are inversely transformed from the frequency domain back to the time domain at step 110. At this point, together with $x_i'$, which by the initial assumption needs no coupling correction, the corrected quantities $y_i$ and $z_i$ may now be displayed at 112 as in FIG. 8, modeled or otherwise processed as demanded by the needs of the exploration project. Switch 116 causes the program to iterate though another common trace gather via receiver selector 118 until all desired combinations of shots and receivers have been processed. It should be observed that switch 116 equally well could be inserted between steps 110 and 112 if desired.

This invention has been described with a certain degree of specificity by way of example but not by way of limitation. For example, although corrections for NMO have not been included, such corrections may be included if desired. The limitations imposed to define the near-offset and the time window may be revised to accommodate specific areas of survey. The method has been explained with reference to the generic concept of common-trace gathers. The method herein described easily may be modified for application to dry land-based seismic exploration by ignoring calculations calling for the presence of a pressure sensor. Those skilled in the art will devise obvious variations to the examples given herein but which will fall within the scope of this invention which is limited only by the appended claims.

What is claimed is:

1. A computer-aided method, comprising:
   (a) receiving a plurality of multi-component seismic signals from corresponding multi-component receivers resting at a bottom of a body of water following insonification from a plurality of source locations, the signals being formatted in the time domain as common-trace gathers of in-line, cross-line, vertical and pressure signal components;
   (b) transforming the respective gathers from the time domain to the frequency domain;
   (c) for each frequency of interest, generating cross-line and vertical coupling coefficients by minimizing, in a least-square sense, the sum of a selected subset of the in-line, cross-line and vertical signal components;
   (d) using the so-generated cross-line and vertical coupling coefficients, calculating corrected cross-line responses over all travel times and shots;
   (e) for each frequency of interest, generating a second cross-line coupling coefficient by minimizing, in a least square sense, the sum of a subset of the vertical signal components and the corrected cross-line responses;
   (f) using the second cross-line coupling coefficients, calculating partially corrected vertical responses over all travel times, shots and receivers;
   (g) for each frequency of interest, generating a second vertical coupling coefficient by minimizing in a least-squares sense, a subst of the partially-corrected vertical response and the pressure signal components;
   (h) using the second vertical coupling coefficient, calculating the fully corrected vertical responses for all travel times, shots, and receivers;
   (i) transforming the in-line, corrected cross-line, corrected vertical and pressure signal components from the frequency domain to the time domain; and
   (j) storing the so-transformed signal components in a computer memory for use in further processing to display a model of a volume of the earth's subsurface in a desired manner.

2. The method as defined by claim 1, comprising:
   the subsets are selected in terms of a pre-selected range and azimuth of a source location relative to a preferred receiver location.

3. The method of claim 2, comprising:
   repeating steps a) through i) for all combinations of multi-component receivers and source locations prior to execution of step j).

4. The method as defined by claim 3, comprising:
   prior to step b), normalizing the in-line, cross-line and vertical signal components from the common trace gathers for spherical divergence.

5. The method as defined by claim 4, wherein:
   steps c) and d) are executed with the aid of the formulation to minimize the cross-line horizontal energy:

$$\Sigma_i |-\sin(\theta_i)x'_i + \cos(\theta_i)[c_y(\omega)y_i' + v_y(\omega)z_i']|^2 = \min$$

to provide the cross-line and vertical coupling coefficients $c_y(\omega)$ and $v_y(\omega)$ and, for each frequency of interest, to provide the corrected cross-line component, $y(\omega)$, from $$y(\omega) = c_y(\omega)y'(\omega) + v_y(\omega)z'(\omega);$$

executing step e) using the formulation $$\Sigma_i |V_z(\omega)z_i|^2 = \Sigma_i |z_i' - c_z(\omega)y_i|^2 = \min$$

and solving for the second cross-line coupling coefficient, $c_z(\omega)$ from $$c_z(\omega)\sum_i y_i \bar{y}_i = \sum_i z_i' \bar{y}_i;$$

and determining the partially-corrected vertical responses, $z''(\omega)$, from $$z''(\omega) = V_z(\omega)z(\omega) = z'(\omega) - c_z(\omega)y(\omega);$$

at step g), minimizing the summation in the relation $$v_z \sum_i z_i'' \bar{z}_i'' = \frac{1}{r_s'} \sum_i p_i' \bar{z}_i''$$

to solve for the second vertical response coefficient, $v_z(\omega)$; and
   determining the fully-corrected vertical responses, $z(\omega)$, from $$z(\omega) = v_z(\omega) z''(\omega).$$

6. A computer-aided method for processing seismic signals to balance the spectral response characteristics of the seismic signals, the seismic signals having propagated through a volume of the earth between a source location and a multi-component receiver resting at a bottom of a body of water, said seismic signals having traveled over different trajectories having a common intersection, the signals being stored in a computer matrix formatted in the time-space domain as in-line, cross-line, vertical, and pressure common-trace gathers, comprising:
   (a) transforming the respective gathers from the time domain to the frequency domain;
   (b) for each frequency of interest, generating cross-line and vertical coupling coefficients by minimizing, in a least-squares sense, the sum of a selected subset of the in-line, cross-line and vertical signal components;
   (c) using the so-generated cross-line and vertical coupling coefficients, calculating corrected cross-line responses over all travel times and shots;
   (d) for each frequency of interest, generating a second cross-line coupling coefficient by minimizing, in a least squares sense, the sum of a subset of the vertical signal components and the corrected cross-line responses;

(e) using the second cross-line coupling coefficients, calculating partially-corrected vertical responses over all travel times, receivers and shots;

(f) for each frequency of interest, generating a second vertical coupling coefficient by minimizing in a least squares sens, a subset of the partially corrected vertical response and the pressure signal components;

(g) using the second vertical coupling coefficients, calculating the fully-corrected vertical coupling responses for all travel times and all shots;

(h) transforming the in-line, corrected cross-line and corrected vertical signal components from the frequency domain to the time domain; and (i) displaying the so-transformed corrected signal components.

7. The method as defined by claim 6 wherein:

the subsets are selected from within a pre-selected time window for traces from near offsets.

8. The method of claim 7, comprising:

repeating steps a) through h) for all combinations of multi-component receiver and source locations prior to execution of step i).

9. The method as defined by claim 8, wherein:

prior to step a), normalizing the in-line, cross-line and vertical signal components from the common-trace gathers for spherical divergence.

10. The method as defined by claim 9, wherein:

step b) is executed with the aid of the formulation to minimize the cross-line horizontal energy:

$$\Sigma_i |-\sin(\theta_i)x'_i + \cos(\theta_i)[(c_y(\omega)y'_i + v_y(\omega)z'_i)]|^2 = \min$$

to provide the cross-line and vertical coupling coefficients $c_y(\omega)$ and $v_y(\omega)$;

for each frequency of interest, providing at step c) the corrected cross-line component, $y(\omega)$, from $$y(\omega) = c_y(\omega)y'(\omega) + v_y(\omega)z'(\omega);$$

executing step d) using the formulation $$\Sigma_i |V_z(\omega)z_i|^2 = \Sigma_i |z'_i - c_z(\omega)y_i|^2 = \min,$$

solving for the second cross-line coupling coefficient, $c_z(\omega)$, step e), from $$c_z(\omega)\sum_i y_i \overline{y}_i = \sum_i z'_i \overline{y}'_i;$$

and determining the partially corrected vertical response, $z''(\omega)$, from $$z''(\omega) = V_z(\omega)z(\omega) = z'(\omega) - c_z(\omega)y(\omega);$$

at step f), minimizing the summation in the relation $$v_z \sum_i z''_i z''_i = \frac{1}{r'_s} \sum_i p'_i z''_i$$

to solve for the second vertical response coefficient, $v_z(\omega)$; and determining the fully corrected vertical response, $z(\omega)$, from $$z(\omega) = v_z(\omega)z''(\omega).$$

11. A computer-aided method, comprising:

(a) receiving by multicomponent receivers resting at a bottom of a body of water seismic signals representative of multi-modal seismic wavefield components formatted in the time-space domain as a plurality of common-trace gathers;

(b) transforming the respective gathers from the time-space domain to the frequency domain;

(c) for each frequency of interest, generating a first cross-line coupling coefficient and a first vertical coupling coefficient by minimizing, in a least squares sense, the sum of a selected subset of spatially polarized in-line, cross-line and vertical signal components;

(d) using the so-generated first cross-line and first vertical coupling coefficients, calculating corrected cross-line responses for all gathers;

(e) for each frequency of interest, generating a second cross-line coupling coefficient by minimizing, in a least squares sense, the sum of a subset of the vertical signal components and the corrected cross-line responses;

(f) using the second cross-line coupling coefficient, calculating partially corrected vertical responses for all gathers;

(g) for each frequency of interest, generating a second vertical coupling coefficient by minimizing in a least-squares sense, a subset of the partially-corrected vertical response and a subset of unpolarized signal components;

(h) using the second vertical coupling coefficient, calculating the fully-corrected vertical responses for all of aid plurality of common trace gathers;

(i) transforming the in-line, corrected cross-line and corrected vertical signal components from the frequency domain to the time-space domain; and (j) storing the so-transformed signal components in a computer memory for use in further processing to display a desired model of a volume of the earth's subsurface.

12. The method as defined by claim 11, comprising:

where the respective signal subsets are selected from within a time window having a pre-selected width for traces from near offsets.

13. The method as defined by claim 12, wherein:

the multi-component signals are derived from a plurality of multi-component receiver units after insonification by a plurality of sources from different source locations.

14. The method as defined by claim 13, comprising:

repeating steps a) through i) for all combinations of source and receiver locations.

15. The method as defined by claim 13, wherein:

each multi-component receiver unit includes three receivers that are polarized along along three mutually orthogonal spatial axes and one unporalized receiver.

16. A computer-aided method, comprising:

(a) receiving at a multicomponent receiver resting on a bottom of a body of water seismic signals representative of multi-modal seismic wavefield components formatted in the time-space domain as common-trace gathers;

(b) transforming the respective gathers from the time-space domain to the frequency domain;

(c) for each frequency of interest, generating a first cross-line coupling coefficient and a first vertical coupling coefficient by minimizing, in a least-squares sense, the sum of a selected subset of spatially polarized in-line, cross-line and vertical signal components;

(d) using the so-generated first cross-line and first vertical coupling coefficients, calculating corrected cross-line responses for all gathers;

(e) for each frequency of interest, generating a second cross-line coupling coefficient by minimizing, in a least-squares sense, the sum of a subset of the vertical signal component and the corrected cross-line responses;

(f) using the second cross-line coupling coefficient, calculating corrected vertical responses for all gathers;

(g) transforming the in-line, corrected cross-line and corrected vertical signal components from the frequency domain to the time-space domain, and (h) storing the so-transformed signal components in a computer memory for use in further processing to display a desired model of a volume of the earth's subsurface.

17. The method as defined by claim 16, comprising:

normalizing the in-line, cross-line and vertical signal components from the common-trace gathers prior to executing step b); and selecting the subsets from within a preselected time window for traces from near offsets.

18. A method of conducting a seismic survey of the earth underneath a body of water, comprising:

(a) activating a seismic source at a plurality of locations thereby propagating seismic waves into the earth beneath the body of water;

(b) using a plurality of multicomponent receivers on the bottom of the body of water to receive reflections of the seismic waves from at least one reflecting layer in the earth, each said multicomponent receiver producing associated in-line, cross-line, vertical and pressure signals in response to said reflected seismic waves; and (c) for at least one of the plurality of multicomponent receivers, correcting the vertical and cross-line signals using the in-line and pressure signals.

19. The method of claim 18 wherein correcting the vertical and cross-line signals further comprises:

(i) transforming each of the associated in-line, cross-line, vertical and pressure signals from the time domain to the frequency domain to give a plurality of associated spectra for each multi-component receiver;

(i) for at least one frequency of interest, generating cross-line and vertical coupling coefficients for each said multi-component receiver by minimizing, in a least-square sense, the sum of a selected subset of the in-line, cross-line and vertical signal components;

(ii) using the so-generated cross-line and vertical coupling coefficients, calculating corrected cross-line responses over all travel times and shots;

(iii) for each frequency of interest, generating a second cross-line coupling coefficient by minimizing, in a least square sense, the sum of a subset of the vertical signal components and the corrected cross-line responses;

(iv) using the second cross-line coupling coefficients, calculating partially corrected vertical responses over all travel times, shots and receivers;

(v) for each frequency of interest, generating a second vertical coupling coefficient by minimizing in a least-squares sense, a subset of the partially-corrected vertical response and the pressure signal components; and (vi) using the second vertical coupling coefficient, calculating the fully corrected vertical responses for all travel times, shots, and receivers.

20. The method of claim 19 further comprising transforming the in-line, corrected cross-line, corrected vertical and pressure signal components from the frequency domain to the time domain.

* * * * *